US009684713B2

(12) United States Patent
Bhandari et al.

(10) Patent No.: US 9,684,713 B2
(45) Date of Patent: Jun. 20, 2017

(54) METHODS AND SYSTEMS FOR RETRIEVAL OF EXPERTS BASED ON USER CUSTOMIZABLE SEARCH AND RANKING PARAMETERS

(71) Applicant: EXPERT SYSTEM FRANCE, Paris (FR)

(72) Inventors: Archna Bhandari, Vienna, VA (US); Kirk Baker, Rockville, MD (US)

(73) Assignee: EXPECT SYSTEM FRANCE, Paris (FR)

( * ) Notice: Subject to any disclaimer, the term of this patent is extended or adjusted under 35 U.S.C. 154(b) by 592 days.

(21) Appl. No.: 14/138,783

(22) Filed: Dec. 23, 2013

(65) Prior Publication Data

US 2014/0181098 A1   Jun. 26, 2014

Related U.S. Application Data

(63) Continuation of application No. PCT/US2012/043970, filed on Jun. 25, 2012.

(60) Provisional application No. 61/500,233, filed on Jun. 23, 2011.

(51) Int. Cl.
*G06F 17/30* (2006.01)
*G06F 7/00* (2006.01)

(52) U.S. Cl.
CPC .. *G06F 17/30684* (2013.01); *G06F 17/30722* (2013.01); *G06F 17/30976* (2013.01)

(58) Field of Classification Search
CPC ......... G06F 17/30684; G06F 17/30722; G06F 17/30976

USPC ......................................................... 707/728
See application file for complete search history.

(56) References Cited

U.S. PATENT DOCUMENTS 6,078,924 A * 6/2000 Ainsbury .......... G06F 17/30011
                                                707/999.101
7,376,635 B1   5/2008 Porcari et al.
7,395,222 B1   7/2008 Sotos
7,499,591 B2   3/2009 Simske et al.
(Continued)

OTHER PUBLICATIONS

International Search Report dated Sep. 14, 2012; International Patent Application No. PCT/US2012/043970.

*Primary Examiner* — Pavan Mamillapalli
(74) *Attorney, Agent, or Firm* — Stradley Ronon Stevens & Young LLP

(57) ABSTRACT

Methods and systems for finding experts based upon user customizable search and ranking criteria, and providing the search results at a person or expert level are disclosed. The methods generally entail cataloging data within one or more document databases, and includes the steps of (a) inputting disparate data sources which may include publications, awarded grants, clinical trials, and/or patents; (b) processing the data within each document in the document database(s); (c) creating a document profile for each document using relevant keywords; (d) assigning weighting factors to the relevant keywords based upon selected attributes; (e) assigning an identifier to each document and document author; (f) removing duplicate document data using a disambiguation algorithm; (g) extracting author level attributes from the retrieved documents; and (h) creating or updating each document profile. The method steps may be implemented using a system of computer servers communicatively linked to a plurality of clients via a global network.

23 Claims, 20 Drawing Sheets

(56) References Cited

U.S. PATENT DOCUMENTS

| | | | |
|---|---|---|---|
| 7,617,193 B2 | 11/2009 | Bitan et al. | |
| 7,899,825 B2 | 3/2011 | Davis et al. | |
| 8,380,489 B1* | 2/2013 | Zhang | G06F 17/2785 |
| | | | 704/4 |
| 8,498,983 B1* | 7/2013 | Zhang | G06F 17/30687 |
| | | | 706/12 |
| 8,843,476 B1* | 9/2014 | Zhang | G06F 17/30719 |
| | | | 707/723 |
| 2003/0140037 A1 | 7/2003 | Deh-Lee | |
| 2004/0098362 A1* | 5/2004 | Gargi | G06F 17/3028 |
| | | | 707/999.001 |
| 2007/0061319 A1* | 3/2007 | Bergholz | G06F 17/3071 |
| | | | 707/999.005 |
| 2007/0118515 A1 | 5/2007 | Dehlinger | |
| 2008/0109419 A1* | 5/2008 | Murakami | G06F 17/30864 |
| | | | 707/999.003 |
| 2008/0301105 A1 | 12/2008 | Chen et al. | |
| 2009/0077126 A1* | 3/2009 | Li | G06Q 30/02 |
| | | | 707/999.103 |
| 2009/0171894 A1 | 7/2009 | Schachter | |
| 2010/0049684 A1* | 2/2010 | Adriaansen | G06F 17/27 |
| | | | 706/46 |
| 2011/0022549 A1 | 1/2011 | Zhuang et al. | |
| 2013/0132154 A1* | 5/2013 | Mayburd | G06Q 30/0202 |
| | | | 705/7.31 |
| 2014/0089246 A1* | 3/2014 | Adriaansen | G06N 5/02 |
| | | | 706/46 |

* cited by examiner

701

"lung cancer" 🔍 ×

RESULTS     SORT EXPERTS     Export     801
1    805 — Document     SUMMARY Vokes, Everett E — 802a    VIEW PROFILE▸

👤
     804
Lung cancer
P C Hoffman, A M Mauer, E E Vokes Lancet. 2000 Feb 5 3559202479-55

*Lung cancer ... Lung cancer* remains a major worldwide health problem, accounting for more than a sixth of cancer.

Sex-associated differences in survival of patients undergoing resection for lung cancer
M K Ferguson, J Wang, P C Hoffman, D J Haraf, J Olak, G A Masters, E E Vokes, The Annals of Thoracic Surgery, 2000 Jan 1-69(1):245-9; discussion 249-50.

... Sex-associated differences in survival of patients undergoing resection for *lung cancer* ...
The increasing incidence of *lung cancer* among women prompted us to assess whether sex ...

803

802b

Bremner, Ross Macrae    VIEW PROFILE▸

👤

Lung cancer and cyclooxygenase-2.
J Esteban Castelso, Robert D Bart, Costanzo A Diperna, Eric M Sievers, Ross M Bremner. The Annals of Thoracic Surgery. 2003 Oct 1;76(4)1327-35.

... *Lung cancer* and cyclooxygenase-2 ... *Lung cancer* is by far the leading cause of cancer-related death. Overall survival is poor and has ...

| Name | Pub | Grant | Proc | Guideline |
|---|---|---|---|---|
| Everett, E Vokes | 15 | | | |
| Bremner, Ross Macrae | 5 | | | |
| Adjel, Alex A | 10 | | | |
| Patterson, G Alexander | 6 | | | |
| Bepler, Gerold | 15 | | | |
| Henschke, Claudia I. | 8 | | | |
| Altorki, Nasser K | 16 | | | |
| Wada, Hiromi | 5 | | | |
| Sugarbaker, David J | 6 | | | |
| Kris, Mark G | 7 | | | |
| Jett, James R | 16 | | | |
| Rabe, Klaus F. | 6 | | | |
| Mitsudomi, Tetsuya | 7 | | | |
| Shepherd, Frances A | 16 | | | |
| Coleman, Robert Edward | 5 | | | |
| Ichinose, Yukito | 8 | | | |
| Yokomise, Hiroyasu | 5 | | | |

FIG. 8A

"kidney disease"

Search Settings

▼ Content
- ☑ Medline
  - ☐ Clinical
  - ☐ Geriatric
  - ☐ Guideline
  - ☐ Pediatric
  - ☐ Translational
- ☑ NIH Grant
- ☑ Digestive Disease Week
- ☑ Patents ▼ Bibliographic: Medline
- ☐ First Authors Only
- ☐ Last Authors Only
- At least [5] Publications
- From: [ ] (ex: 2005)
- To: [ ] (ex: 2011)
- ☐ Journal Publication Country
- ☐ Journal Publication Language ▼ People
- ☐ Name
- ☐ Affiliation
- ☐ Country Results per page [25 ▼]   Next>>   Export   Expand All Sort By: Document Relevance

| Name | Affiliation | Total ▼ | Publications | Grants | Conferences | Patents |
|---|---|---|---|---|---|---|
| A S Levey | William B Schwartz Division of Nephrology, Tufts Medical Center, Boston... | 48 | 43 | 5 | 0 | 0 |
| Michael G Shlipak | TUFTS MEDICAL CENTER | 33 | 28 | 5 | 0 | 0 |
| George Bakris | American Society of Hypertension, Inc University of Chicago, Department... | 28 | 27 | 1 | 0 | 0 |
| Josef Coresh | JOHNS HOPKINS UNIVERSITY | 28 | 25 | 3 | 0 | 0 |
| Marcello Tonelli | Department of Public Health Sciences, University of Alberta, Edmonton, A... | 27 | 27 | 0 | 0 | 0 |
| P A McCullough | St. John Providence Health System, Providence Park Heart Institute, Novi... | 26 | 26 | 0 | 0 | 0 |
| M J Samak | TUFTS MEDICAL CENTER | 24 | 20 | 4 | 0 | 0 |
| M A Pfeffer | Cardiovascular Division, Department of Medicine, Brigham and Women's Hos... | 21 | 21 | 0 | 0 | 0 |
| J W Kusek | Division of Kidney, Urologic, and Hematologic Diseases, National Institu... | 19 | 19 | 0 | 0 | 0 |
| A S Levin | Division of Nephrology, University of British Columbia, 1081 Burrard Str... | 18 | 18 | 0 | 0 | 0 |
| Brenda R Hemmelgarn | Department of Medicine, University of Calgary, Calgary, Alberta. | 18 | 18 | 0 | 0 | 0 |
| Braden J Manns | Department of Medicine, University of Calgary, Calgary, Alta. | 16 | 16 | 0 | 0 | 0 |
| Paul Muntner | Department of Epidemiology, University of Alabama at Birmingham, Birming... | 16 | 15 | 1 | 0 | 0 |
| Lesley Stevens | TUFTS MEDICAL CENTER | 16 | 15 | 1 | 0 | 0 |
| Kamyar Kalantar- | AMERICAN SOCIETY OF NEPHROLOGY, INC. | 16 | 11 | 5 | 0 | 0 |

Expert Country

1 ▬ 788

Top 10 Journals
- J. Urol...
- N. Engl. J. Med...
- Circulation
- Am. J. Cardiol...
- Am. J. Pan...
- Am. J. Med. Sci...
- Am. Heart J...
- Arch. Intern. Med...
- Am. Intern. Med...
- J. Am. Coll. Cardio...

Journal Type
- Clinical
- Pediatric

"lung cancer" 🔍 ✕

RESULTS
1

SORT EXPERTS
901 — Document

Export

SUMMARY

| Name | Pub | Grant | Proc | Guideline |
|---|---|---|---|---|
| Everett, E Vokes | 15 | | | |
| Bremner, Ross Macrae | 5 | | | |
| Adjei, Alex A | 10 | | | |
| Patterson, G Alexander | 6 | | | |
| Bepler, Gerold | 15 | | | |
| Henschke, Claudia I. | 8 | | | |
| Altorki, Nasser K | 16 | | | |
| Wada, Hiromi | 5 | | | |
| Sugarbaker, David J | 6 | | | |
| Kris, Mark G | 7 | | | |
| Jett, James R | 16 | | | |
| Rabe, Klaus F. | 6 | | | |
| Mitsudomi, Tetsuya | 7 | | | |
| Shepherd, Frances A | 16 | | | |
| Coleman, Robert Edward | 5 | | | |
| Ichinose, Yukito | 8 | | | |
| Yokomise, Hiroyasu | 5 | | | |

Shepherd, Frances A          VIEW PROFILE ▸

👤 Princess Margaret Hospital, University of Toronto, Toronto, Ontario, Canada

Erlotinib in lung cancer-molecular and clinical predictors of outcome.
Ming-Sound Tsao, Akira Sakurada, Jean-Claude Cutz, Chang-Qi Zhu, Suzanne Kamel-Reid, Jeremy Squire, Ian Lorimer,Tong Zhang, Ni Liu, Manijeh Daneshmand, Paula Marrano, Gilda Da Cunha Santos, Alain Lagarde, Frank Richardson, Lesley Seymour, Mario Whitehead, Keyue Ding, Joseph Pater, Frances A. Shepherd. The New England Journal of Medicine, 2005 Jul 14; 353(2):133-44

... Erlotinib in *lung cancer* - molecular and clinical predictors of outcome. ... A clinical trial that compared erlotinib with a placebo for a non-small-cell *lung cancer* demonstrated ...

Adjuvant Chemotherapy for Early-Stage Non-Small Cell Lung Cancer.
Antonio L. Visbal, Matasha B. Leighl, Ronald Feld, Frances A. Shepherd. Chest. 2005 Oct 1; 128(4):2933-43.

... Adjuvant Chemotherapy for Early-Stage Non-Small Cell *Lung Cancer*. ...*Lung cancer* is the leading cause of cancer-related mortality in the developed world. Non-small cell ...

Jett, James R.          VIEW PROFILE ▸

👤 Thoracic Diseases and Medical Oncology, Mayo Clinic, 200 First Street SW, R

Advances in chemotherapy of non-small cell lung cancer.
Julian R. Molina, Alex A. Adjei, James R. Jett, Chest. 2006 Oct 1: 130(4):1211-9

... Advances in chemotherapy of non-small cell *lung cancer*. ... In the United States, *lung cancer* kills more men and women than the next three most common cancers ...

A comparison of cytology and fluorescence in situ hybridization for the detection of *lung cancer* in bronchoscopic specimens.

FIG. 9A

| Name | Affiliation | Total | Publications | Grants | Conferences | Patents | Average SJR |
|---|---|---|---|---|---|---|---|
| A S Levey (903) | William B Schwartz Division of Nephrology, Tufts Medical Center, Boston... | 48 | 43 | 5 | 0 | 0 | 1.38 |
| Michael G Shlipak | TUFTS MEDICAL CENTER | 33 | 28 | 5 | 0 | 0 | 1.14 |
| George Bakris | American Society of Hypertension, Inc University of Chicago, Department... | 28 | 27 | 1 | 0 | 0 | 1.01 |
| Josef Coresh | JOHNS HOPKINS UNIVERSITY | 28 | 25 | 3 | 0 | 0 | 1.16 |
| Marcello Tonelli | Department of Public Health Sciences, University of Alberta, Edmonton, A... | 27 | 27 | 0 | 0 | 0 | 0.82 |
| P A McCullough | St. John Providence Health System, Providence Park Heart Institute, Novi... | 26 | 26 | 0 | 0 | 0 | 1.01 |
| M J Sarnak | TUFTS MEDICAL CENTER | 24 | 20 | 4 | 0 | 0 | 1.11 |
| M A Pfeffer | Cardiovascular Division, Department of Medicine, Brigham and Women's Hos... | 21 | 21 | 0 | 0 | 0 | 1.52 |
| J W Kusek | Division of Kidney, Urologic, and Hematologic Diseases, National Institu... | 19 | 19 | 0 | 0 | 0 | 1.15 |
| A S Levin | Division of Nephrology, University of British Columbia, 1081 Burrard Str... | 18 | 18 | 0 | 0 | 0 | 0.59 |
| Brenda R Hemmelgarn | Department of Medicine, University of Calgary, Calgary, Alberta. | 18 | 18 | 0 | 0 | 0 | 0.90 |
| Braden J Manns | Department of Medicine, University of Calgary, Calgary, Alta. | 16 | 16 | 0 | 0 | 0 | 1.01 |
| Paul Muntner | Department of Epidemiology, University of Alabama at Birmingham, Birming... | 16 | 15 | 1 | 0 | 0 | 0.83 |
| Lesley Stevens | TUFTS MEDICAL CENTER | 16 | 15 | 1 | 0 | 0 | 1.39 |

| Name | Affiliation | Total | Publications | Grants | Conferences | Patents | Average SJR |
|---|---|---|---|---|---|---|---|
| A S Levey | William B Schwartz Division of Nephrology, Tufts Medical Center, Boston... | 48 | 43 | 5 | 0 | 0 | 1.38 |
| Michael G Shlipak | TUFTS MEDICAL CENTER | 33 | 28 | 5 | 0 | 0 | 1.14 |
| Josef Coresh | JOHNS HOPKINS UNIVERSITY | 28 | 25 | 3 | 0 | 0 | 1.16 |
| George Bakris | American Society of Hypertension, Inc University of Chicago, Department... | 28 | 27 | 1 | 0 | 0 | 1.01 |
| Marcello Tonelli | Department of Public Health Sciences, University of Alberta, Edmonton, A... | 27 | 27 | 0 | 0 | 0 | 0.82 |

FIG. 9D

PROFILE

Vokes, Everett E
evokes@medicine.bad.uchicago.edu

United States

Show Co-author Network

ALL DOCUMENTS

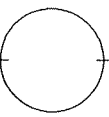

Publications 98 —— Proceeding 1

RELEVANT KEYWORDS

Lung Neoplasms
Antineoplastic Combined
Chemotherapy Protocols
Male
Humans
Female
Aged
Middle aged
Carcinoma, Non-Small-Cell Lung
Carboplatin
Adult
Survival Rate
Combined Modality Therapy

RELEVANT PUBLICATIONS

Randomized phase II trail of docetaxel plus cetuximab or docetaxel plus bortezomib in patients with advanced non-small-cell lung cancer and a performance status of 2: CALGB 30402
Rogerio Lilenbaum, Xiaofei Wang, Lin Gu, Jeffrey Kirshner, Keith Lerro, Everett Vokes, Journal of clinical oncology: official journal of the American Society of Clinical Oncology. 2009 Sep 20. 27(27):4487-91

Randomized phase II trail of induction chemotherapy followed by concurrent chemotherapy and dose-escalated thoracic conformal radiotherapy (74 Gy) in stage III non-small-cell lung cancer: CALGB 30105
Mark A Socinski, A William Blackstock, Jeffrey A Bogart, Xiaofei Wang, Michael Munley, Julian Rosenman, Lin Gu, Gregory A Masters, Peter Ungaro, Arthur Sleaper, Mark Green, Antonius A Liller, Everett E Vokes, Journal of clinical oncology: official journal of the American Society of Clinincal Oncology, 2008 May 20. 26 (15) 2457-63

FIG. 10A  1000

A S Levey

Affiliation:
TUFTS MEDICAL CENTER

Email:
not yet available

Summary ❓

Publications (43 of 202)
Conference Presentations (0)
NIH Grants (5 of 6)
Patents (0)

Co-Authors (495) ❓

Josef Coresh (60)
M J Sarnak (50)
TM Green (48)
Lesley Stevens (45)
J W Kusek (35)
Gerald Beck (29)
Hocine Tighlouart (25)
Christopher H Schmid (24)
Deeb Salem (18)
G Eknovan (18)

Publication Timeline

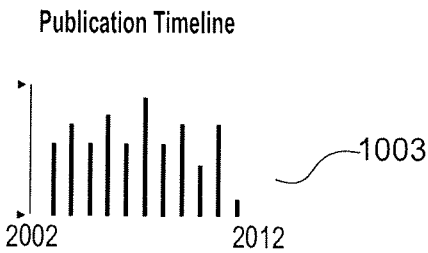
2002 — 2012 — 1003

Most Descriptive Keywords

Kidney Diseases
Glomerulor Filtration Rate
Kidney Failure, Chronic
Creatinine
Chronic Disease
Cardiovasculor Diseases
Middle Age
Aged
Risk Factors
Male — 1005

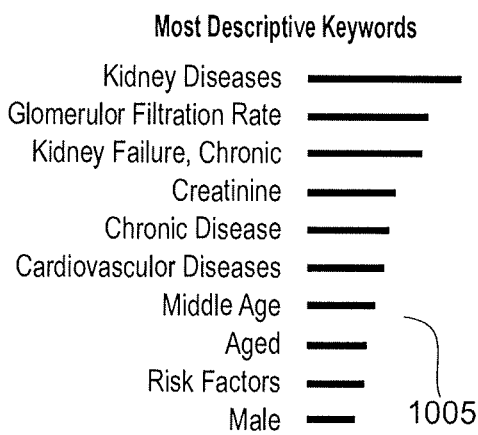

Query-Relevant Publication Timeline

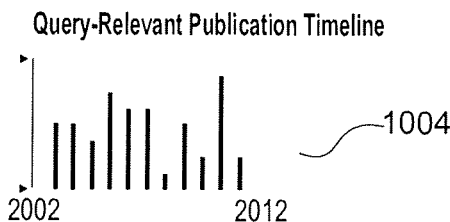
2002 — 2012 — 1004

Most Descriptive Query-Related Keywords

Kidney Diseases
Cardiovascular Diseases
Glomerulor Filtration Rate
Creatinine
Kidney Failure, Chronic
Chronic Disease
Risk Factors
Aged
Renal Insufficiency, Chronic
Middle Age — 1006

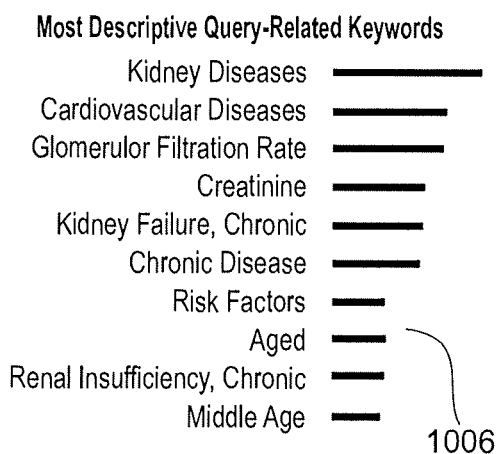

FIG. 10B

▼ Top 10 Journals

- Am. J. Kidney Dis. ━━━━━━━━━━━━━━━━━━━━━
- J. Am. Soc. Nephrol. ━━━━━━━━
- Kidney Int. ━━━━━━
- Am. Intern. Med. ━━━━
- Clin. J. Am. Soc. Nephrol. ━━━
- N. Engl. J. Med. ━━
- Nephrol. Dial. Transplant. ━━
- Circulation ━
- Clin. Chem. ▪
- Am. Heart J. ▪

▼ Query-Relevant Publications (43)

Comparison of risk prediction using the CKD-EPI equation and the MDRD study equation for estimated glomerular filtration rate.
*Matsushita K, et al. JAMA : the journal of the American Medical Association. 2012 May;307(18):1941-51*

Chronic kidney disease
*Levey AS, et al. Lancet. 2012 Jan;379(9811):165-80*

Bardoxolone methyl. chronic kidney disease, and type 2 diabetes
*Upadhyay A, et al. The New England journal of medicine. 2011 Nov;365(18):1746; author reply 1746-7*

Predictors of fatal and nonfatal cardiovascular events in patients with type 2 diabetes mellitus, chronic kidney disease and anemia: an analysis of the Trial to reduce cardiovascular Events with Aranesp (darbepoetin-alfa) Therapy (TREAT)
*McMurray JJ, et al. American heart journal. 2011 Oct;162(4):748-755.e3*

Prognostic assessment of estimated glomerular filtration rate by the new Chronic Kidney Disease Epidemiology Collaboration equation in comparison with the modification of Diet in Renal Disease Study equation.
*Skali H, et al. American heart journal. 2011 Sep;162(3):548-54*

A predictive model for progression of chronic kidney disease to kidney failure
*Tangri N, et al. JAMA : journal of the American Medical Association. 2011 Apr;305(15):1553-9*

FIG. 10C

METHODS AND SYSTEMS FOR RETRIEVAL OF EXPERTS BASED ON USER CUSTOMIZABLE SEARCH AND RANKING PARAMETERS

CROSS-REFERENCE TO RELATED APPLICATIONS

This application is a U.S. National Phase of International Application No. PCT/US2012/043970 filed on Jun. 25, 2012, which claims priority to U.S. Provisional Application No. 61/500,233 filed on Jun. 23, 2011, the contents of which are incorporated by reference herein, in their entirety and for all purposes.

FIELD OF THE INVENTION

The present invention relates generally to the field of search engines and, in more particularity, to a search engine for finding experts or particular expertise in a given field. More specifically, in preferred embodiments, the present invention relates to methods and systems for identifying and finding, or retrieving, expertise based on user customizable search and ranking parameters.

BACKGROUND OF THE INVENTION

Search engines are software programs designed to search for electronic information based on user queries and to then return results of the search to the user. Today, web or internet search engines are widely used to search for information on the world wide web (the "Web"), FTP servers, or the internet. Several commonly used web search engines include Google™, Bing, Yahoo!, Baidu, and Yandex. Web search engines work by storing information on numerous web pages, which are then retrieved by a web crawler. The contents of each web page are analyzed, indexed and data relating to the web pages are stored in a database for later use. When a user enters a query in a web search engine using a browser (such as Internet Explorer, Firefox, Safari, Chrome, or the like), the engine examines its index and returns a list of "relevant" web pages.

Examples exist of various web searching systems and methods. Systems and methods for searching and retrieving information are described, for example, in U.S. Pat. Nos. 7,395,222 and 7,617,193, and U.S. Published Application No. 2011/0022549. In general, these methods involve search engines which receive user queries, search for relevant articles based on the query, calculate a score for one or more parameters, rank and display the search results.

Many of the existing search and retrieval systems return search results at a document level rather than at a person level. A few existing systems find expertise at the people level based on "ask the experts" model or by mining published documents. These systems, however, do not provide the users with an option to either select the data sources or weigh or rank search parameters in real time. Users are accordingly required to search multiple data sources, conduct multiple searches, retrieve the several search results, and then compile and aggregate the various results in order to determine the most relevant or best results for the search parameters selected.

Accordingly, the need exists for a method for producing search results, and a system for implementing the method, based on user customizable search and ranking parameters.

SUMMARY OF THE INVENTION

The present invention overcomes the disadvantages of the prior art and fulfills the needs described above by providing a method for finding expertise based on user customizable search and ranking parameters, and providing the search results at a person or expert level.

More specifically, a preferred embodiment of the present invention is a method for cataloging a data set using a computer processor, the method comprising the steps of (a) accessing a plurality of documents stored in the data set; (b) processing the data and text and content of each of the plurality of documents; (c) creating a document profile for each of the plurality of documents processed, using relevant document metrics; (d) assigning weighting coefficients to each of the relevant document metrics based upon a plurality of data set attributes; (e) assigning a unique identifier to each of the plurality of documents processed; (f) mapping the document profile data using standardization algorithms; (g) removing duplicate documents based upon the mapped document profiles; (h) integrating the document profile data for consistency using the plurality of data set attributes; (i) creating a document profile database using the plurality of data set attributes; (j) indexing said document profile database; and (k) updating said document profile database periodically to incorporate new data set data.

Another preferred embodiment of the present invention is a method for identifying expertise data within one or more document databases using a computer processor, the method comprising the steps of (a) inputting into a computer processor a plurality of data sources, said data sources having respective expertise data and expertise content; (b) processing the expertise data and expertise content of each document within the document database; (c) creating a document profile for each document using document relevant metrics; (d) assigning weighting factors to the document relevant metrics based upon certain attributes; (e) assigning a unique identifier to each document; (f) implementing a disambiguation algorithm on each of the created document profiles; (g) removing duplicate documents based upon implementation of the disambiguation algorithm; (h) extracting expert level attributes from the processed documents; (i) creating a document profile database; and (j) updating said document profile database.

Still another preferred embodiment of the present invention is a method for cataloging an expert data set using a computer processor, the method comprising the steps of (a) accessing a plurality of documents stored in the data set, said documents each having expert information and data; (b) processing the expert information and data of each of the plurality of documents; (c) creating a document profile for each of the plurality of documents processed, using document relevant metrics; (d) assigning weighting coefficients to each of the document relevant metrics based upon a plurality of data set attributes; (e) assigning a unique identifier to each of the plurality of documents processed; (f) mapping the document profile data using standardization algorithms; (g) removing duplicate documents based upon the mapped document profiles; (h) integrating the document profile data for consistency using the plurality of data set attributes; (i) creating a document profile database using the plurality of data set attributes; (j) indexing said document profile database; and (k) updating said document profile database periodically to incorporate new data set information.

A further preferred embodiment of the present invention also includes a method of finding expertise based on user customizable search and ranking parameters, and providing the search results at a person or expert level. This method includes the steps of inputting a search topic query by a user; inputting search and ranking parameters by a user; processing the search topic query and optionally reformulating the query using techniques such as synonym expansion, spelling correction, morphological processing, adding or removing related items, and similar techniques; matching the search query profile to the document profile; assigning a relevance score to each document based on a plurality of criteria; computing a relevance score based on user customized ranking parameters; creating expert profile by aggregating relevant document profile for each expert; computing impact factor based on the relevant document set; and providing a list of relevant experts. The method may include an additional step of providing analytic and interactive visualization capabilities to aid in finding an expert based on additional criteria such as co-author network, affiliation network, and other research trends.

Another preferred embodiment of the present invention is a computerized system for electronically cataloging an expert data set, comprising a plurality of computer processors communicatively linked to a plurality of users, wherein the plurality of computer processors implement the method steps of (a) accessing a plurality of documents stored in the data set, said documents each having expert information and data; (b) processing the expert information and data of each of the plurality of documents; (c) creating a document profile for each of the plurality of documents processed, using document relevant metrics; (d) assigning weighting coefficients to each of the document relevant metrics based upon a plurality of data set attributes; (e) assigning a unique identifier to each of the plurality of documents processed; (f) mapping the document profile data using standardization algorithms; (g) removing duplicate documents based upon the mapped document profiles; (h) integrating the document profile data for consistency using the plurality of data set attributes; (i) creating a document profile database using the plurality of data set attributes; (j) indexing said document profile database; and (k) updating said document profile database periodically to incorporate new data set information.

Moreover, the present invention also includes a system for implementing the above methods in a computer system. In this system, the computer contains a computer-readable storage medium in which the software implementing the above methods are stored and executed. The system includes, among others, a network controller that is communicatively linked to a network such as a Local Area Network, Wide Area Network, Internet, or the like.

The present invention further includes a system for implementing the above methods in a client-server architecture by providing a plurality of servers that are communicatively linked to a plurality of clients via a network. The software implementing the above methods is stored in a computer-readable storage medium provided in the plurality of servers.

In a particular preferred embodiment, the present invention includes a system for implementing the above methods using a cloud computing architecture. The software implementing the methods is stored in an application server in the cloud, and a plurality of clients and data sources are communicatively linked to the cloud.

Other features and advantages of the present invention are provided in the following detailed description of the invention, which refers to the accompanying drawings.

BRIEF DESCRIPTION OF THE DRAWINGS

FIG. 8A illustrates an exemplary embodiment of a search results page interface that may be used with the present invention;

FIG. 8B illustrates another exemplary embodiment of a search results page interface, in a collapsed view, that may be used with the present invention;

FIG. 9A illustrates an exemplary embodiment of a second search results page interface that may be used with the present invention;

FIG. 9C illustrates another exemplary embodiment of a second search results page interface, showing use of a ranking metric, that may be used with the present invention;

FIG. 9D illustrates a further exemplary embodiment of a second search results page interface, showing use of a ranking metric and the flexibility of user-selected weighting of the metrics, that may be used with the present invention;

FIG. 10A illustrates an exemplary embodiment of an expert profile page interface that may be used with the present invention;

FIG. 10B illustrates another exemplary embodiment of an expert profile page interface that may be used with the present invention;

FIG. 10C illustrates an exemplary embodiment of an expert profile page interface, showing specific query relevant expert publications, that may be used with the present invention.

DETAILED DESCRIPTION OF PREFERRED EMBODIMENTS

The disclosed embodiments relate to methods for finding expertise in a selected field, and to the systems for implementing the methods. The following terms as may be used in this specification are defined for convenience, and are not to be viewed as improperly or inappropriately limited the meaning of particular terms.

The term "relevance" or "relevant" is defined as how good a retrieved result meets the information need of the user.

The term "mobile device" also referred to as a handheld device, handheld or handheld computer is intended to include any computing device that may be held in a hand. These devices include, but not limited to, personal digital assistants (PDA); smartphones such as Apple's iPhone, Samsung's Droid and Blackberry Storm; tablet computers such as Apple's iPad, Motorola's Xoom and Samsung's Galaxy Tab; mobile Internet device (MID) such as Lenovo's Ideapad, and Nokia's N810; and cellular phones.

The term "cloud computing" is defined as a model for enabling convenient, on-demand network access to a shared pool of configurable computing resources (such as networks, servers, storage, applications, and services) that can be rapidly provisioned and released with minimal management effort or service provider interaction.

The term "computer-readable storage medium" or "computer-readable storage media" is intended to include any medium or media capable of storing data in a machine-readable format that can be accessed by a sensing device and capable of converting the data into binary format. Examples include, but not limited to, floppy disk, hard drive, zip disk, tape drive, CD-ROM, CD-R, CD-RW, DVD-ROM, DVD-RW, blu-ray disc, USB flash drive, RAM, ROM, solid state drive, memory stick, multimedia card, CompactFlash, holographic data storage devices, minidisc, semiconductor memory or storage device, or the like.

The elements and architecture of preferred embodiments of computer systems, that may implement preferred embodiments of the inventive methods for searching for expert data, are first described.

Figure 1:
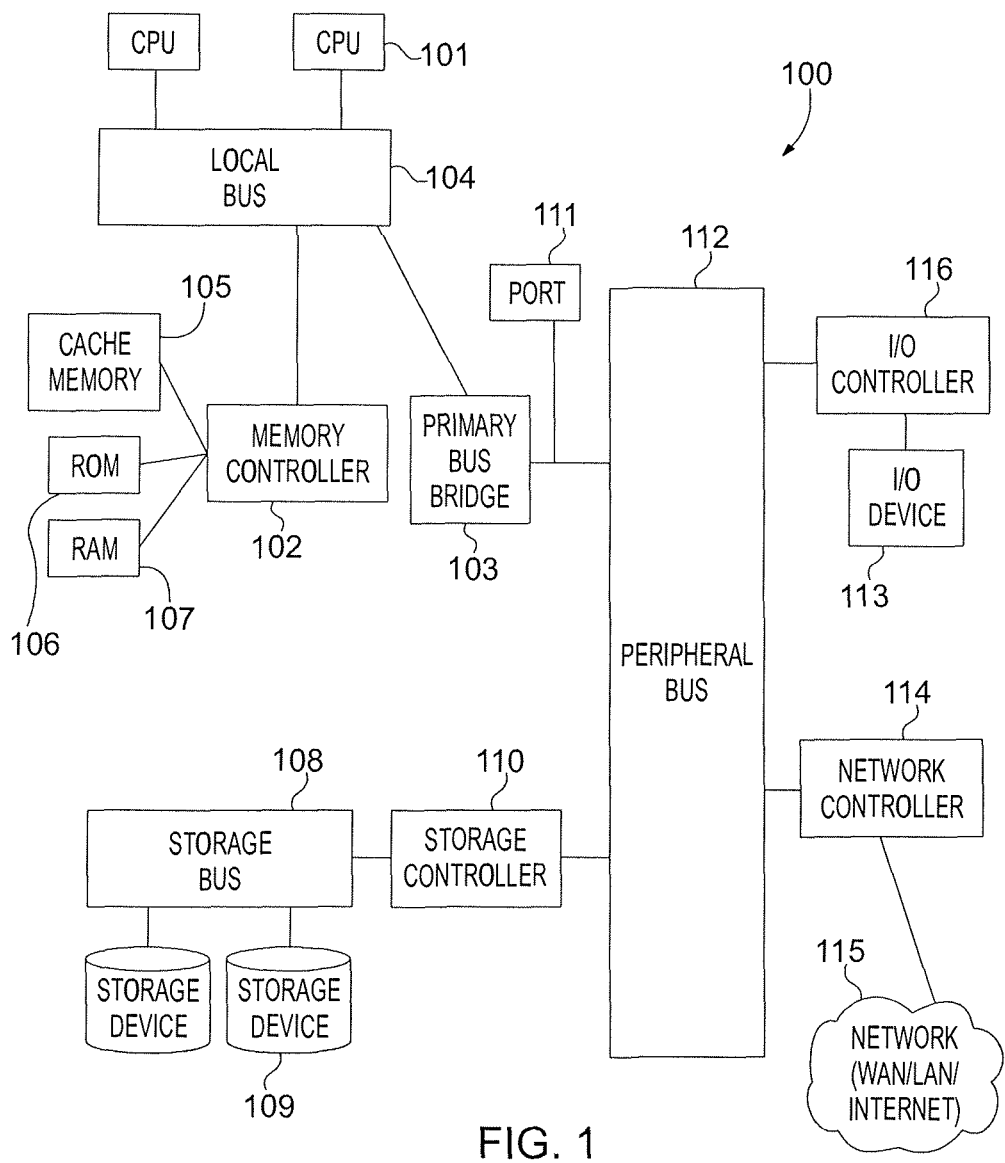
FIG. 1 illustrates a computing system in which methods according to various embodiments of the invention may be implemented.

Referring now to the attached drawings, where like elements are designated by like reference numerals, FIG. 1 illustrates a computer system 100 for implementing the methods in accordance with various embodiments of the invention. The system 100 includes one or more processors (or central processing units (CPUs)) 101 coupled to a local bus 104. A memory controller 102 and a primary bus bridge 103 are coupled to the local bus 104. The computer system 100 may include multiple memory controllers 102 and multiple primary bus bridges 103. The memory controller 102 may also be coupled to a Read-Only Memory (ROM) 106, a Random-Access Memory (RAM) 107, and a cache memory 105, which may be the only cache memory in the computer system 100. Alternatively, CPUs 101 may also include cache memories, which may form a cache hierarchy with cache memory 105.

The primary bus bridge 103 is coupled to at least one peripheral bus 112. Various devices, such as peripherals or additional bus bridges may be coupled to the peripheral bus 112. These devices may include a storage controller 110, an I/O controller 116, and a network controller 114. The primary bus bridge 112 may also be coupled to one or more ports 111 including, but not limited to, parallel communication port, serial communication port, universal serial bus, or special purpose high-speed ports. In a personal computer, for example, the special purpose port might be an Accelerated Graphics Port (AGP), used to couple a high performance video card to the computer system 100.

Storage devices 109 may be coupled to a storage bus 108 which in turn may be coupled to a storage controller 110.

Storage devices 109 may be internal or external to the computer system 100 and may include, but not be limited to, hard disk drives, floppy disk drives (FDD), universal serial bus (USB) flash drives, memory cards, magnetic tapes, CD-ROM, BD-ROM, CD-R, DVD-R, BD-R, CD-RW, DVD-RW, DVD+RW, DVD-RAM, or BD-RE. I/O device 114 may be coupled to an I/O controller 114 which in turn may be coupled to the peripheral bus 112. The I/O device 114 may be external or internal to the computer system 100 and may include, but not be limited to (i) input devices such as keyboards, mouse, trackballs, touch pads, touch screens, pens, joy sticks, microphones, and webcams; and (ii) output devices such as monitors, speakers, and printers.

While FIG. 1 illustrates an architecture especially suitable for a general-purpose computer, such as a personal computer or a workstation, it should be recognized that well known modifications can be made to configure the computer system 100 to become more suitable for use in a variety of applications. The modifications may include, for example, elimination of unnecessary components, addition of specialized devices or circuits, and integration of a plurality of devices.

Computer system 100 may be coupled via a network controller 114 to a network 115, for example, a Local Area Network (LAN) 203 (FIG. 2), Wide Area Network (WAN) 202 (FIG. 2), Internet 201 (FIG. 2), Metropolitan Area Network (MAN), Wireless Local Area Network (WLAN), Storage Area Network/System Area Network (SAN), Campus Area Network (CAN) or any other network to receive or send information. Computer system 100 may communicate with network 115 using connectionless packet switching including, but not limited to, Ethernet, Internet Protocol (IP) and User Datagram Protocol (UDP) or connection oriented packet switching including, but not limited to, X.25, Frame Relay, Asynchronous Transfer Mode (ATM), and Multiprotocol Label Switching (MPLS).

Figure 2:
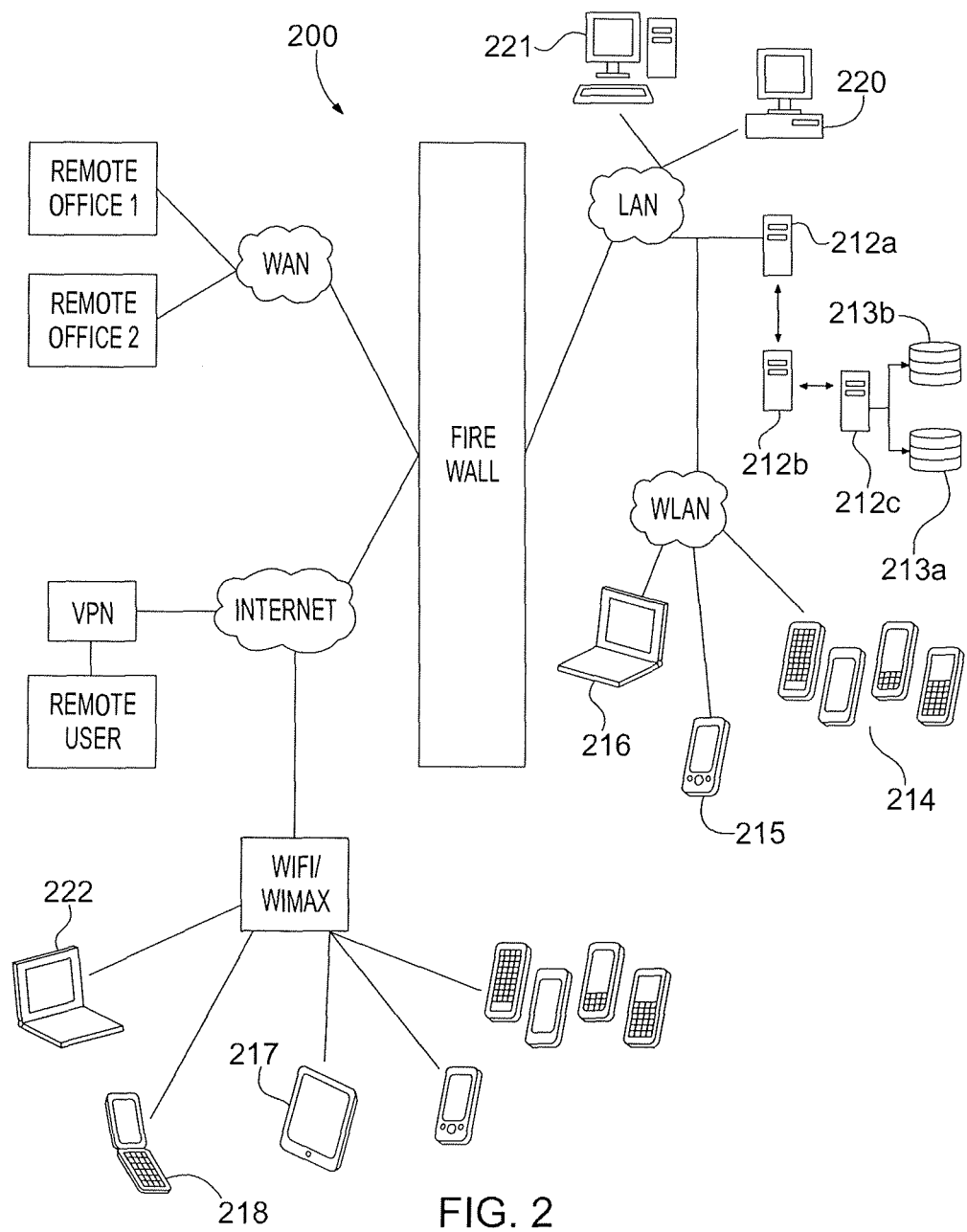
FIG. 2 is a schematic diagram of an exemplary embodiment of a system in which the methods according to preferred embodiments may be implemented.

FIG. 2 illustrates a distributed architecture in which methods according to various embodiments of the invention may be implemented. It should be recognized that well-known modifications can be made to system 200 to become more suitable for use in a variety of applications. For example, the distributed architecture may include, but not be limited to, client-server, 3-tier architecture, n-tier architecture, peer-to-peer, or clustered architecture. Referring to FIG. 2, a plurality of servers 212a, 212b, 212c may be communicatively linked to a plurality of clients 220, 221, 214, 215, 216. The plurality of servers 212a, 212b, 212c and the plurality of clients 220, 221, 214, 215, 216 may each be communicatively linked to a network such as LAN 203 or WLAN 204. Further, LAN 203 may be communicatively linked to a plurality of offices at remote locations—remote office 1 206, remote office 2 207—via WAN 202; or to a plurality of remote users 210 or a plurality of mobile devices 214, 215, 217, 218, 222 via the Internet 201.

In a preferred embodiment, the plurality of servers may include, but not be limited to, an application server 212b, database server 212c, web server 212a, print server, mail server, message server, domain name system (DNS) server, or file server. The hardware and software requirements of the plurality of servers vary depending on the server application and a person of ordinary skill in the art would know how to communicatively link the plurality of servers to the plurality of clients via the network.

Application server 212b may contain computer hardware including computer-readable storage medium and software framework to provide an environment in which applications may be executed. Application server 212b may host applications such as Microsoft Office, Visual Studio, and Visio. Further, software implementing particular embodiments of the invention may be stored in the computer-readable storage medium of the application server 212b for execution.

Database server 212c may be coupled to databases 213a, 213b that may be hierarchical, relational, distributed or object-oriented database management systems. Some examples of database servers may be Oracle, DB2, Informix, Ingris, SQL server, Solr, MongoDB and Berkley DB.

Web server 212a may contain computer hardware and/or software to help deliver content that may be accessed through the Internet 201. Web server 212a may respond to a client's 214, 215, 217, 218, 222 hypertext transfer protocol (HTTP) request and deliver hypertext markup language (HTML) documents including, but not limited to, style sheets and JavaScripts. Some examples of web server products include, but not limited to, Apache, internet information services (IIS), Google web server (GWS), IBM HTTP server, and these web servers may contain web applications such as Java Development Kit (JDK), .NET, WebSphere, or the like.

In a client-server architecture, as shown in FIG. 2, a plurality of servers are communicatively linked to a plurality of clients. Clients may be mobile devices, or a personal computer such as a desktop computer 221, a workstation 220, a laptop 216, a netbook 222, a nettop (not shown), or the like. Clients may be a thick client providing rich functionality independent of a server or a thin client that depends heavily on a server for computational needs. Each of the clients may have applications such as a virtual private network (VPN) 209 that enables secure connection of a remote user 210 to LAN 203, or a web browser such as Internet Explorer, Firefox, Safari, Chrome, or the like to connect to the Internet 201.

The various networks (LAN 203, WLAN 204, WAN 202) may have one of several topologies including, but not limited to, point-to-point, bus, star, ring, tree, mesh and hybrid. The plurality of servers 212a, 212b, 212c, the plurality of clients 220, 221 and/or the plurality of networks 201, 202, 203, 204 may be communicatively linked using 100Base-T Ethernet, digital subscriber line (DSL), integrated service digital network (ISDN), DS lines, dedicated T1/T3 lines, fiber-optic cables, satellite dish or the like.

Figure 3:
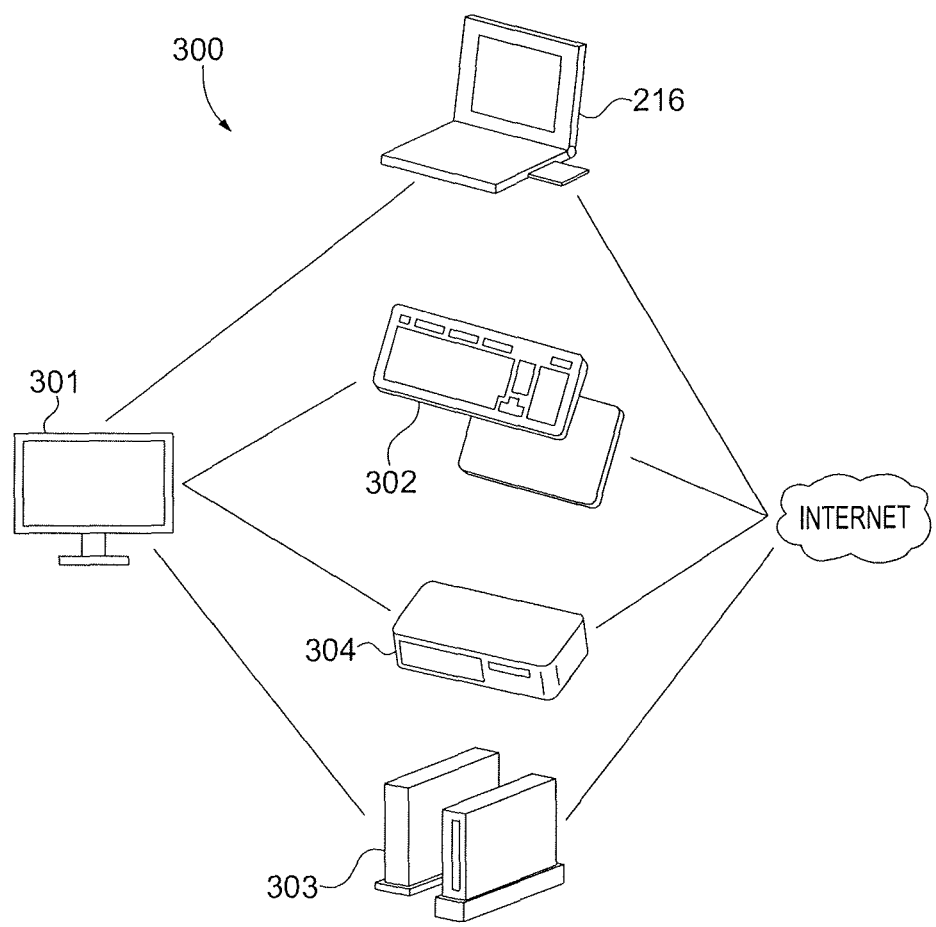
FIG. 3 is another schematic diagram of an exemplary embodiment of a system in which the methods according to preferred embodiments may be implemented.

Referring to FIG. 3, a system 300 includes a television 301 communicatively linked to the Internet 201. In a preferred embodiment, the television 301 may be coupled to a plurality of devices including, but not limited to, a laptop 216, smart TV device 302, game console 303, and set-top box 304. Smart TV device 302 provides users with content from TV providers as well as user-generated content using internet applications. Smart TV products currently in the market may include Google TV, Samsung Smart TV, Yahoo! Connected TV, or the like. Set-top box (STB) 304 and game console 303 may be devices that connect to television 301 and a source of signal enabling display of content on the television screen. For example, game consoles may include, but not be limited to, Nintendo's Wii, Microsoft's Xbox or Sony's PlayStation and set-top boxes may include, but not be limited to, Nokia's Mediamaster, or Motorola's DCT700. While FIG. 3 illustrates a general purpose television, it should be recognized that well known modifications can be made to make it function as an internet TV, web TV, connected TV, smart TV, interactive TV, internet protocol TV, or the like in which methods according to various embodiments of the invention may be implemented.

Figure 4:
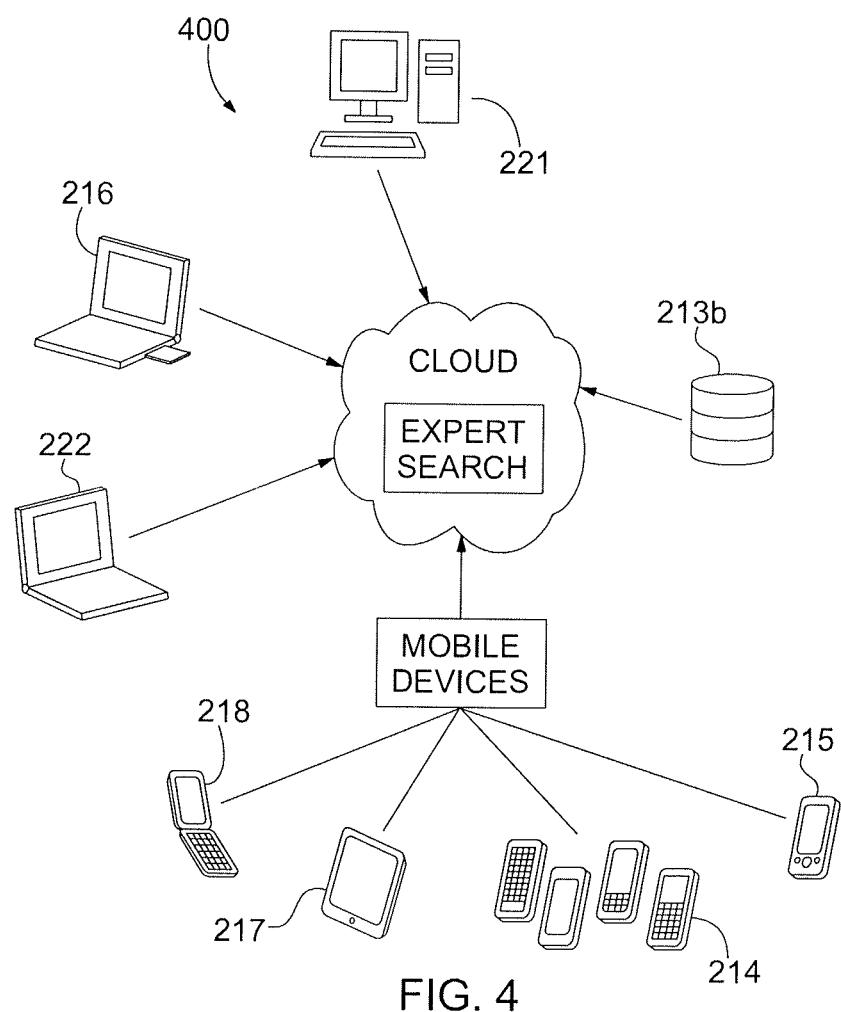
FIG. 4 is a schematic diagram of an exemplary embodiment of a system in which the methods according to preferred embodiments may be implemented.

FIG. 4 illustrates a cloud computing architecture in which methods according to various embodiments of the invention may be implemented. Referring to FIG. 4, mobile devices 402, clients (such as netbook 222, laptop 216, and desktop 221), databases 213b, and data sources (not shown) may be communicatively linked to the cloud 401. Preferred embodiments of the search engine methods 001, may be hosted on the cloud 401.

The cloud 401 may be a private cloud, community cloud, combined cloud, hybrid cloud, or any other cloud model. The cloud 401 may have services such as Software as a Service (SaaS), which eliminates the need to install and run an application on a client machine; Platform as a Service (PaaS), which facilitates a computing platform in the cloud; and Infrastructure as a Service (IaaS), which delivers computer infrastructure such as servers, storage and network equipment on the cloud.

The inventive methods 001 are a software application, implemented on one or more computer processors, that may be written in a procedural or object-oriented language. In a preferred embodiment, the inventive method 001 is an interactive web application that retrieves, processes, and displays data from a search server such as Solr or a database such as MySQL in response to user actions.

Figure 5:
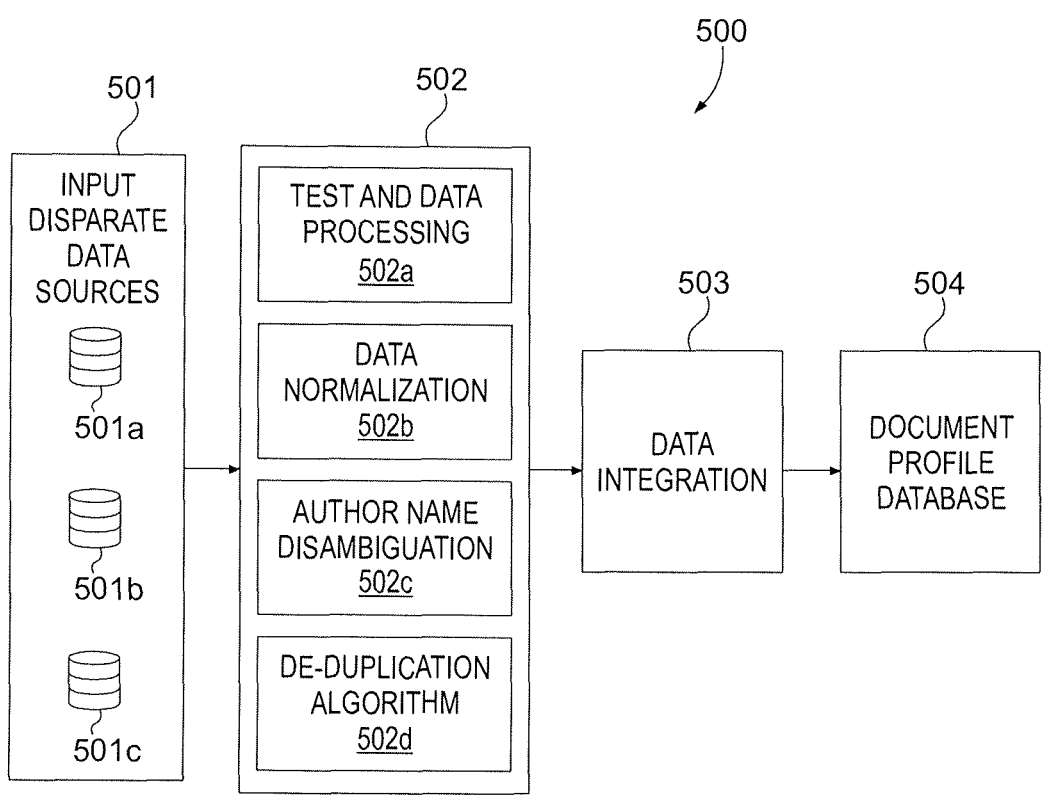
FIG. 5 illustrates a block diagram of an exemplary implementation of an embodiment of the present inventive method showing connections with the data sources and creation of a document profile database.

In a preferred embodiment of the present invention, as shown in FIG. 5, a method of cataloging a document set is shown. In step 501, a plurality of disparate data sources 501a, 501b, 501c are accessed for information such as, but not limited to, publications, conference proceedings, clinical trials, awarded grants, standards, guidelines, patent applications and patents. Data from a plurality of such sources are stored in databases in 213a, 213b. The plurality of and disparate data sources 501a, 501b, 501c may include, but not be limited to, publications and guidelines available on the National Library of Medicine's (NLM) Medline®, the National Institute of Health and Sciences (NIH)'s awarded grants, and the American Association of Cancer Research's (AACR) conference proceedings.

In step 502, the text and data processing module 502a processes the data and text of each of the plurality of documents received from the plurality of disparate data sources 501a, 501b, 501c. Document profiles for the plurality of documents are created from the processing of the data and text, using keywords or concepts. Different methods for extracting keywords or concepts are known, and include methods such as simple keyword indexing, noun phrase extraction, or use of a controlled vocabulary, for example, NLM's Medical Subject Headings (MeSH) thesaurus. The keywords or concepts are then assigned weights based on a plurality of attributes including, but not limited to, frequency, specificity, and location. By way of example, keywords or concepts that are found in a document's title may be assigned higher weight than those in the body of the document. Similarly, keywords, concepts, or metrics that are found repeated times within a document may result in a higher weighting.

The data in the plurality of the documents is then mapped/normalized using the data mapping/normalization module 502b. This module ensures that there is standardization among different data sets. For example, standardizing variants like "Jan. 6, 2009" vs. "6 Jan. 2009" or "3/9/2010" (U.S. date format) vs. "9/3/2010" (European date format) are common among different databases. The standardizing of and the correct mapping of these different date formats are critical to temporal analyses of the documents. A unique identifier is then assigned to each document and document author.

Similar to the need to standardize date formats, author ambiguity is a similar and known problem. More specifically, authors may use, or publications may use different versions of an author's name in different publications. For example, an author John Smith may indicate his name as John A. Smith, JA Smith, or John Adam Smith in different publications. The author name disambiguation module 502c disambiguates the normalized data received from the data normalization module 502b. In a preferred embodiment of the present invention, the disambiguation module 502c may use a plurality of metadata information such as coauthors, affiliations, scientific profile, or contact information as a means to resolve any author ambiguity problem.

In addition to author ambiguity problem, data or document duplication may be encountered when data from disparate data sources are aggregated or combined. The inventive method uses a data de-duplication module 502d to remove identified duplicated data. The de-duplication module and process may be implemented, in a preferred embodiment by matching a plurality of metadata information including comparing the titles and abstracts of the documents.

In step 503, the data integration module facilitates integration of data from multiple data sources to provide users with a uniform data view. For example, different databases use different naming schemes, which means that the same record can exist in multiple databases but is labeled differently. By way of one example, an "Author" in Medline may correspond to, or be called a "Scientific Investigator" in clinicaltrials.gov, and still further be identified as an "Inventor" in a patent database. Through the data integration step 503 of the present invention, users need not have to address or be concerned about such variations when searching for an expert. The data integration of the present invention facilitates identifying experts with multiple attributes across different document sources, including, for example, sources such as the number of publications, number of grants, or number of proceedings.

A document profile database 504a is then created as shown in step 504. In a preferred embodiment, the document profile database may be periodically updated, such as on daily, weekly or other time interval. The document profile database 504a is indexed to allow for quick response to user queries, and may be created in databases 213a, 213b as shown in FIG. 2.

Figure 6:
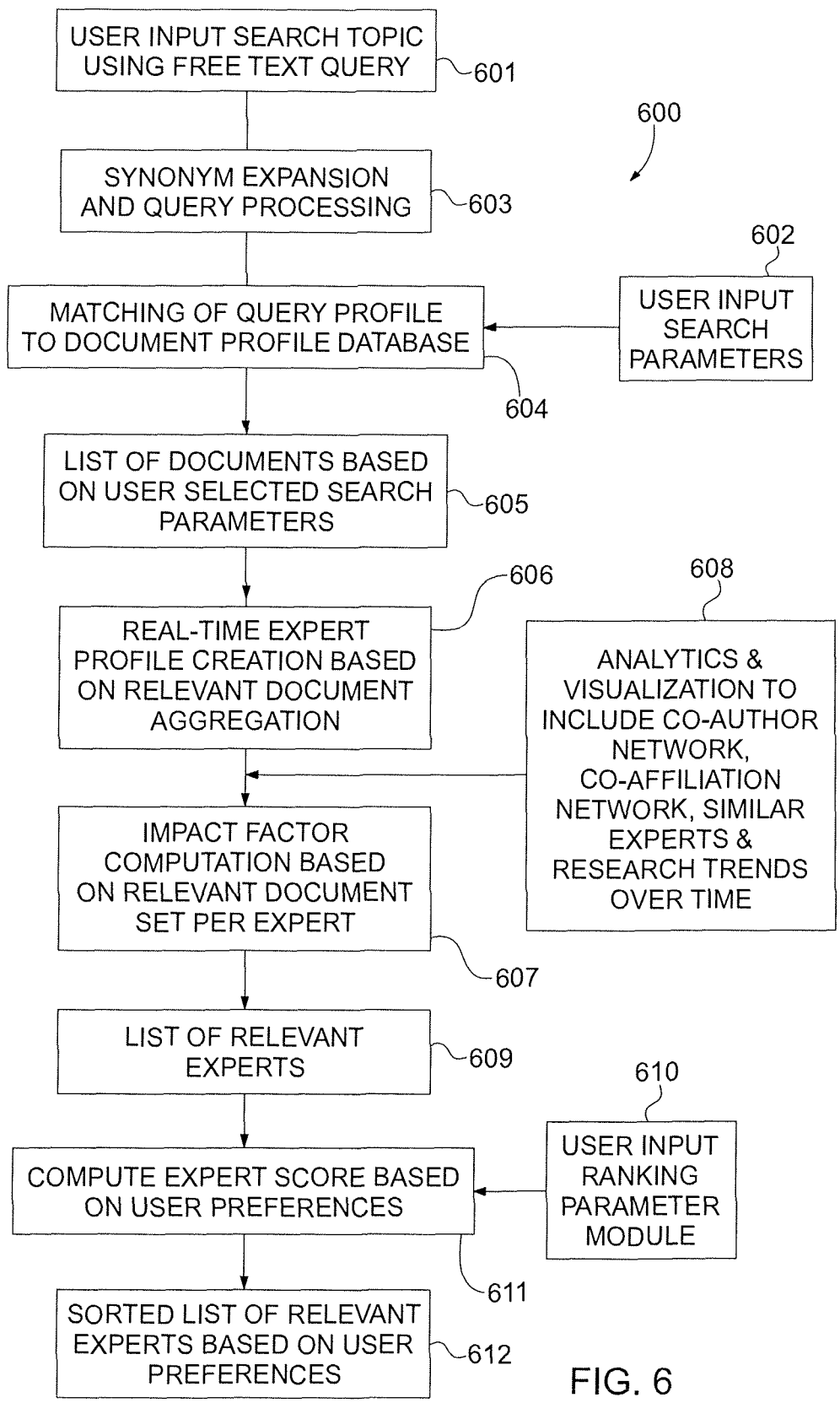
FIG. 6 illustrates a block diagram of an exemplary embodiment of the present inventive method showing the basis method steps.

In further detail of the method steps of a preferred embodiment, as shown in FIG. 6, a user inputs a search topic using free text query in a search query textbox 701 (shown in FIG. 7A) in step 601. The user also enters search parameters in step 602. The search parameters may include, but are not limited to, (i) Document Types 702 comprising of publication 702a (FIG. 7A), grant 702b (not shown), proceeding 702c (FIG. 7A), guideline 702d (not shown), clinical trial 702e (not shown), and patents 702f (not shown); (ii) Document Sections 703 (FIG. 7A) comprising of title 703a (not shown), and abstract 703b (not shown); (iii) Bibliographic 704 (FIG. 7A) comprising of recent documents 704a (not shown), date range 704b (not shown), first author 704c (not shown), last author 704d (FIG. 7A), and h-index 704e (not shown); and (iv) People 705 (FIG. 7A) comprising of clinical experience 705a (FIG. 7A), email address 705b (not shown), affiliation 705c (not shown), name 705d (not shown), country 705e (not shown), and language 705f (not shown). The user may also select a ranking, along a scale from low to high, for each of the parameters on a sliding scale 702a1, 702c1, 704d1, 705a1 (FIG. 7A) corresponding to each of the respective parameters.

Figure 7A:
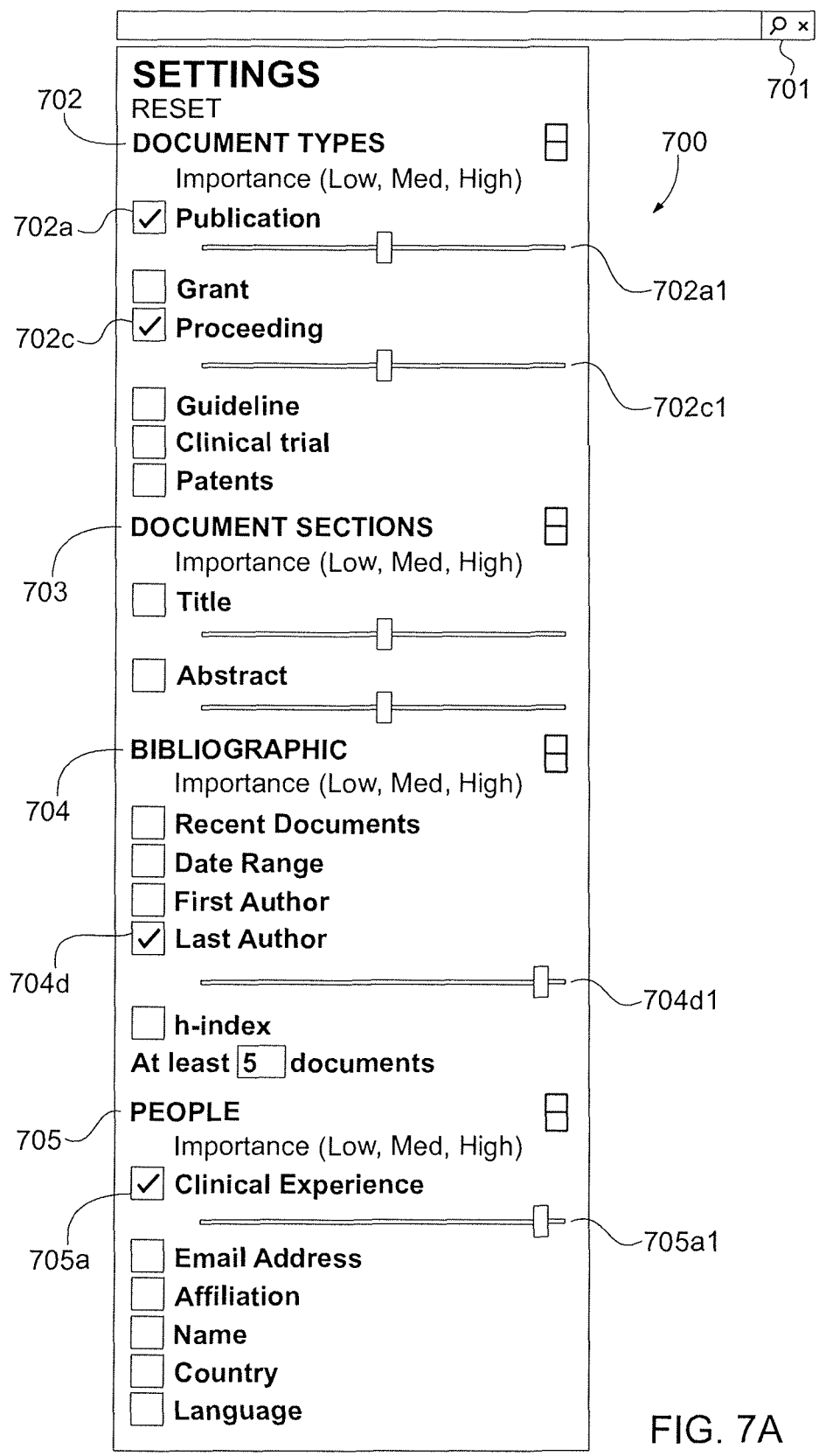
FIG. 7A illustrates an exemplary embodiment of a search page interface that may be used with the present invention.
Figure 7B:
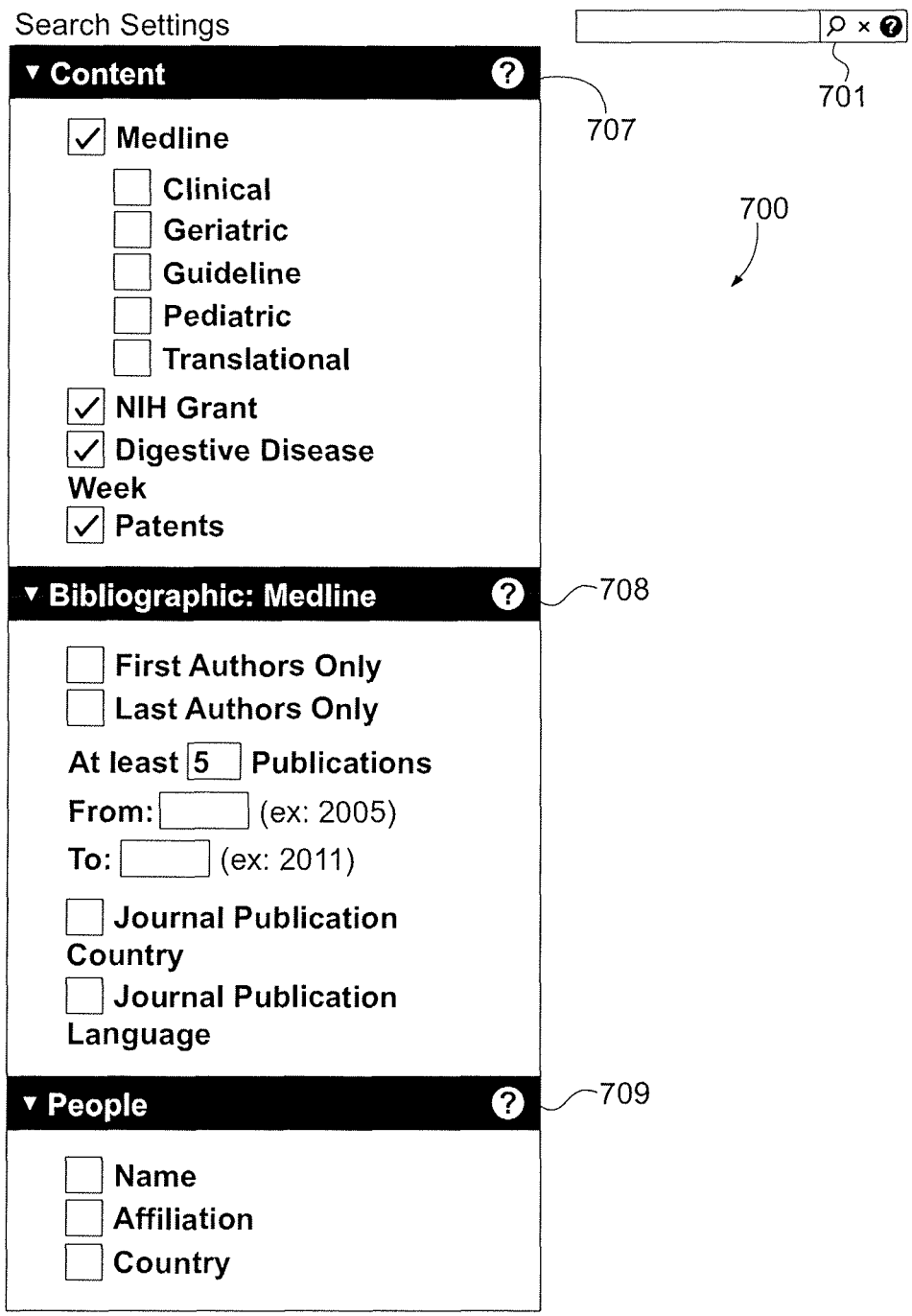
FIG. 7B illustrates another exemplary embodiment of a search page interface that may be used with the present invention.

FIG. 7B illustrates another example or embodiment of a search settings page, including a similar search query textbox 701. The search parameters shown in FIG. 7B include content 707, bibliographic information 708 (which includes by way of example, identification of the first authors only, or identification of the last authors only, a date range, the journal publication country, or the journal publication language), and people 709 (which includes name, affiliation, and country).

Figure 7C:
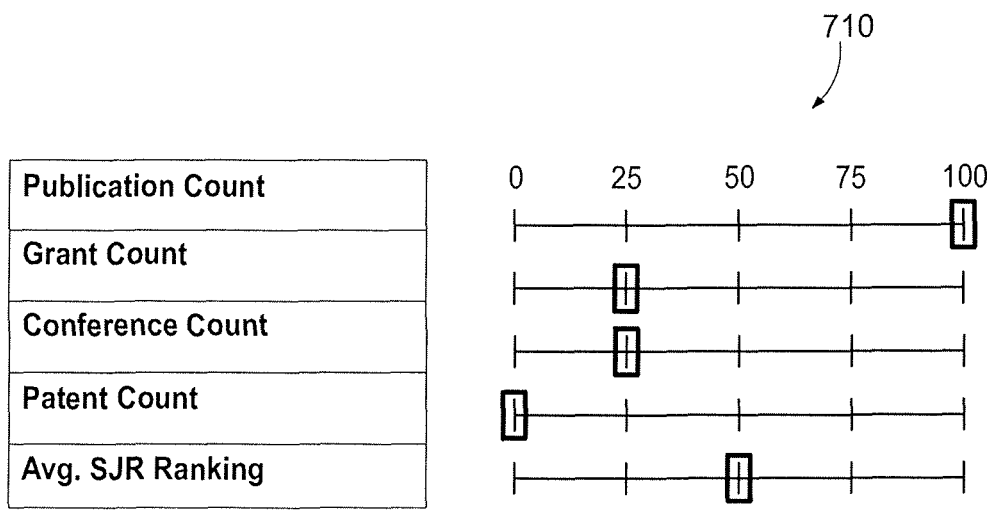
FIG. 7C illustrates an exemplary embodiment of a search page interface section showing a user input ranking parameter module that may be used with the present invention.

In a different preferred embodiment for permitting the user to rank each of the parameters, FIG. 7C shows a graduated scale 710 for each of several parameters (e.g., publication count, grant count, conference count, patent count, and an average journal ranking) that may be individually selected or varied by the user to weight the search according to the user's intentions and needs.

In step 603, the search query is processed, and keywords or concepts are extracted, removing any extraneous or irrelevant phrases from the search query. For example, "find me a . . . " in a search query is a phrase that generally will not contribute to the description of the keyword and accordingly, may be removed from the query terms. In addition, a synonym mapping is conducted to expand the search query terms. Such synonym mapping identifies synonyms for the keywords selected and broadens the search using those identified synonyms.

In step 604, the search query profile is matched to the document profile in the document profile database 504a. A relevance score is assigned to each document based on a plurality of criteria including, but not limited to, term frequency, inverse document frequency, degree of overlap between query terms and document terms, and the length of the document. In step 605, a relevance score is computed for the documents based upon the user's selected search parameters.

Next, in step 606, the method aggregates relevant document profiles for each expert and creates an expert profile. An impact factor, such as h-index or average journal ranking, is then computed 607 based on the relevant documents identified. As shown in step 609, the method creates and provides a list of the relevant experts to the user. To provide the user with customization capability and flexibility, a user input ranking parameter module allows the user to assign 610 individual weighting to each ranking parameter using, for example a sliding or graduated scale 710 (FIG. 7C). With the user's selected ranking parameters and the user selected weightings, the method determines 611 an expert score for each expert. The method then provides a sorted listing 612 of the relevant experts based upon the user's selected preferences.

The user may also by provided with an analytic and interactive visualization capability, step 608, to aid in finding an expert based on additional criteria such as co-author network, affiliation network, and research trends is also provided.

Referring again to FIG. 7A, a user may in one embodiment of the method, specify the search and ranking parameters together. For example, a user may choose, by checking a box, Publication 702a and Proceeding 702c for Document Types 702; Last Author 704d for Bibliographic 704; and Clinical Experience 705a for People 705, as shown in FIG. 7. The user may also choose the ranking for each of the above-mentioned parameters on a sliding scale 702a1, 702c1, 704d1, 705a1 corresponding to the parameters. Subsequently, a user may input a search topic in the search query textbox 701. As noted above, an alternative embodiment of the present invention, provides for the separate user input of search parameters 602 from the user input of ranking parameters 610.

Figure 8C:
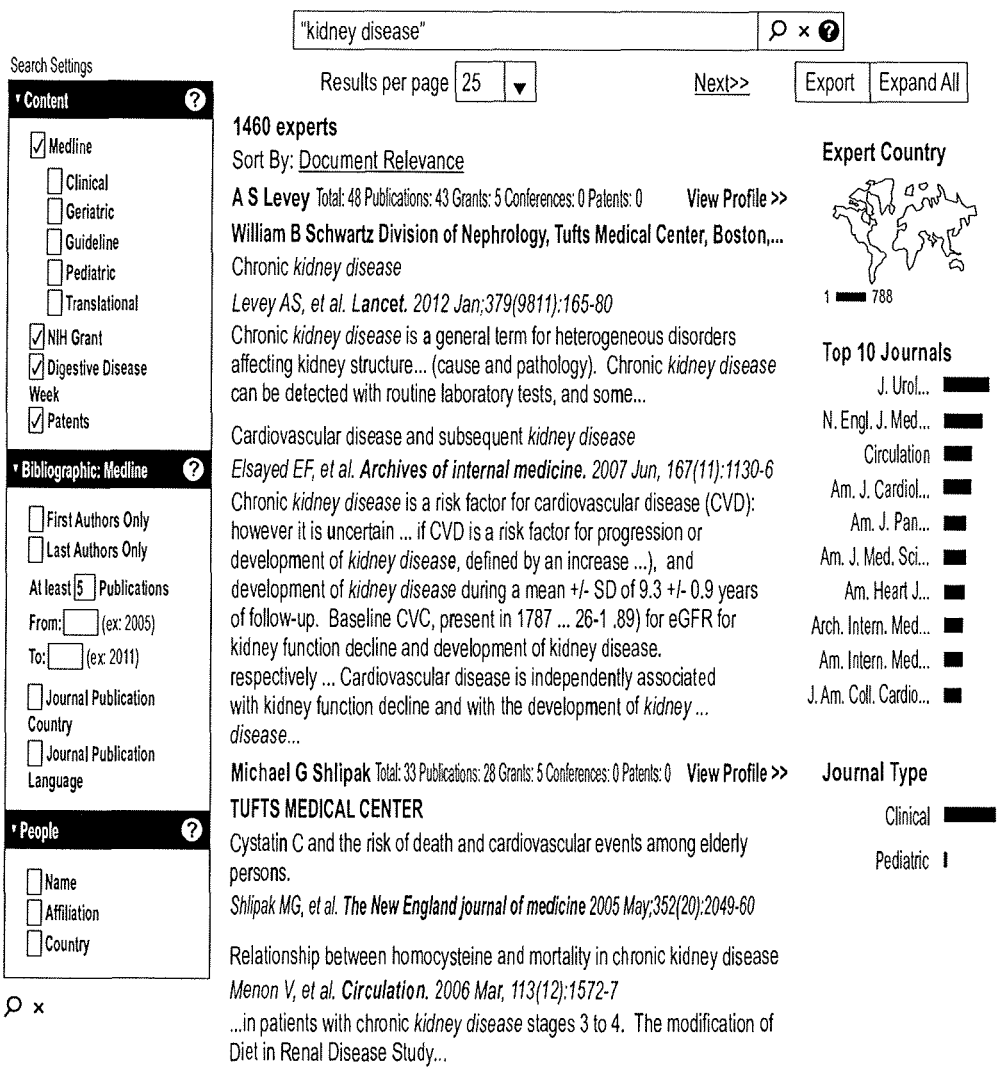
FIG. 8C illustrates another exemplary embodiment of a search results page interface, showing an expanded view with contextual text, that may be used with the present invention.

FIG. 8A shows an example of a results page 800 is shown for the search topic "lung cancer" entered by a user in the search query textbox 701. The results page 800 displays a results summary 801 on the right and a subset of search results for each expert 802a, 802b. For each expert 802a, 802b, a short, cited context of relevant documents is displayed with the search topic highlighted 803. The user may access the relevant documents by clicking on the title link 804. In this preferred embodiment, the experts are sorted based on document relevance 805. An alternative embodiment of a results page is shown in FIG. 8B, showing the results table 809 for the search for "kidney disease" entered into the search query textbox 701, and in a collapsed view, listing for each expert the respective parameters, including in this example, total score, being the summation of publications, grants, conferences, and patents. FIG. 8C shows a related view of the results for the same search of "kidney disease" but now providing the user with contextual information 807 for each expert.

Figure 9B:
FIG. 9B illustrates another exemplary embodiment of a second search results page interface, showing the ability to sort by different expert metrics, that may be used with the present invention.

A further preferred embodiment of the inventive method provides the user with the ability to sort the identified experts based on document count 901, as shown in FIG. 9A. A different visual presentation, as shown in FIG. 9B, allows the user to sort by any of the parameters provided in the results table 809. The table lists for each expert, in the illustrated example, the total score, publications, grants, conferences, and patents. In this embodiment, the user has the flexibility of sorting the experts by any of these parameters. FIG. 9B shows a sorting according to the number of conferences.

In a further preferred embodiment, as illustrated in FIG. 9C, the results table 809 may include an impact factor, such as a journal ranking, or the SCImago Journal Rank 903. Given the very broad customization capability of the inventive method, to allow the user to select ranking parameters, as well as weighting factors for those ranking parameters, the user has substantial flexibility to identify and rank experts based upon one or more parameter according to the user's preferences. FIG. 9D illustrates an example results table showing the top five experts based upon the user's selected preferences. Given changes or variations in the user's selection of ranking parameters, and associated weighting factors, the order, or even which, experts identified in the results table will vary.

In addition to the results table, the inventive method allows the user to drill down to the specific expert and profile information. An exemplary illustration of an expert profile, shown in FIG. 10A, provides the profile of an expert 1000 displayed for a particular search result, and which presents all different document types, relevant keywords found in the relevant documents, and a list of relevant documents. A different preferred embodiment of the expert profile page is shown in FIGS. 10B and 10C, showing bar charts of the publication timeline 1003, query-relevant publication timeline 1004, the most descriptive keywords 1005, and the most descriptive query-related keywords 1006, along with the top 10 journals 1007, and the query-relevant publications. This alternative expert profile page provides the user with ready access to more expert information.

Figure 11:
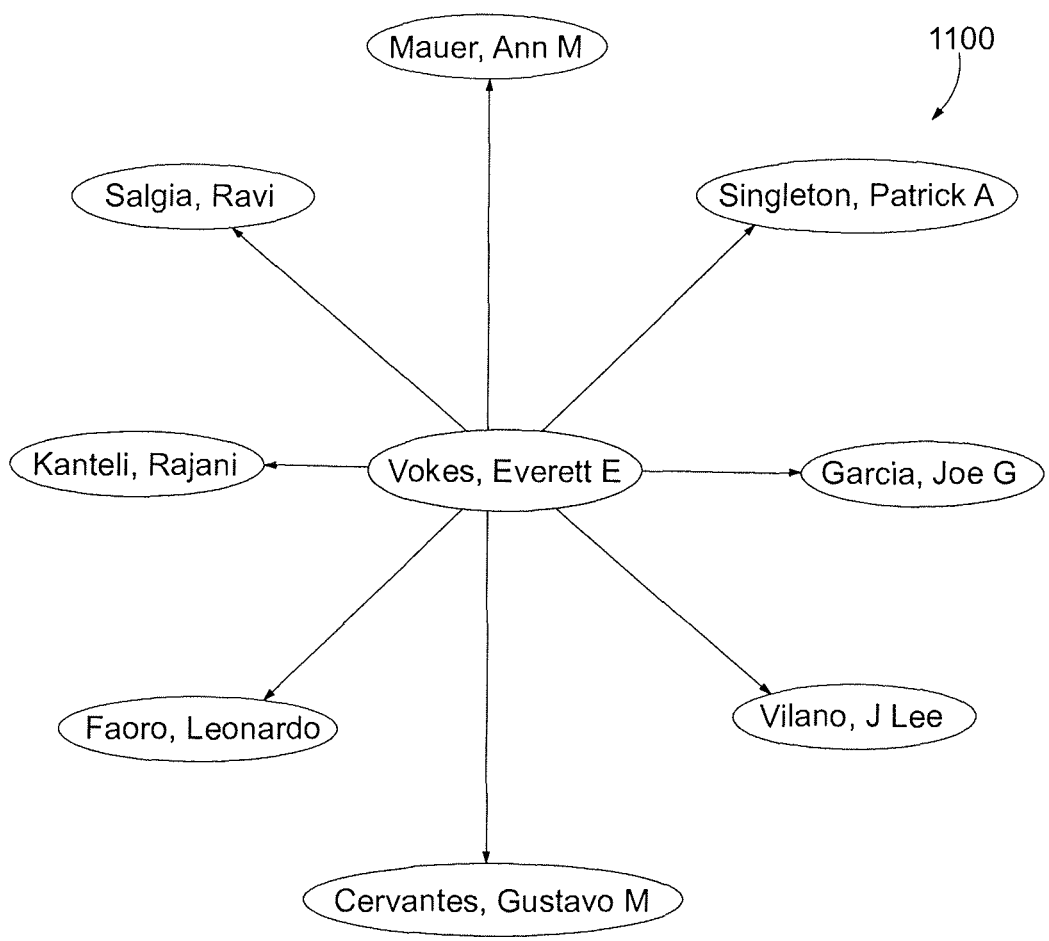
FIG. 11 illustrates an exemplary embodiment of a co-author network display page interface that may be used with the present invention.

As further information for the user resulting from the expert identification and retrieval method, in a preferred embodiment, the co-author network 1100 for a particular expert may be determined and provided. An example of a useful display of such a co-author network is shown in FIG. 11. Further detail or strength of the co-author connections could be illustrated by a relativity of thickness of the lines connecting the co-authors or providing a number of publications with which the co-authors are associated.

While the preferred embodiments shown in FIGS. 5 through 11 are specifically related to the life sciences or medical fields, it should be understood that the inventive searching and cataloging method 001 is equally applicable and useful in other fields including, but not limited to, engineering, legal, financial, and other related fields.

While the present invention is described herein with reference to illustrative embodiments for particular applications, it should be understood that the invention is not limited thereto. Those having ordinary skill in the art and access to the teachings provided herein will recognize additional modifications, applications, embodiments and substitution of equivalents all of which are within the scope of the invention. Accordingly, the invention is not to be considered as limited by the foregoing description.

What is claimed is:

1. A method for cataloging a data set using a computer processor, the method comprising the steps of:
 (a) accessing a plurality of documents stored in the data set;
 (b) processing data, text and content of each of the plurality of documents;
 (c) creating a document profile for each of the plurality of documents processed, using relevant document metrics;
 (d) assigning a unique identifier to each of the plurality of documents processed;
 (e) mapping the document profile data using standardization algorithms;
 (f) removing duplicate documents based upon the mapped document profiles;
 (g) integrating the document profile data for consistency using a plurality of data set attributes;
 (h) creating a document profile database using the plurality of data set attributes;
 (i) indexing said document profile database;
 (j) updating said document profile database periodically to incorporate new data set data;
 (k) selecting, by a user, ones of the relevant document metrics of the document profile;
 (l) assigning, by the user, a weighting coefficient to each of the selected relevant document metrics;
 (m) aggregating relevant document profiles based on the relevant document metrics for each of the experts, and creating an expert profile, and
 (n) providing a ranking of experts using the assigned weighting coefficients.

2. The method for cataloging a data set using a computer processor, as described in claim 1, further comprising the step of: (e1) assigning a unique identifier to an author attribute for each of the plurality of documents processed.

3. The method for cataloging a data set using a computer processor, as described in claim 2, further comprising the step of: (e2) assigning a unique identifier to each of the plurality of created document profiles.

4. The method for cataloging a data set using a computer processor, as described in claim 1, wherein the metrics of step (c) includes one or more of keywords or concepts.

5. The method for cataloging a data set using a computer processor, as described in claim 4, wherein the one or more keywords or concepts, includes one or more of: publications, grants, proceedings, standards, guidelines, clinical trials, patent applications, or patents.

6. The method for cataloging a data set using a computer processor, as described in claim 4, wherein the one or more keywords or concepts, includes one or more of: bibliographic information about publications, date range, first author, last author, or h-index.

7. The method for cataloging a data set using a computer processor, as described in claim 4, wherein the one or more keywords or concepts, includes one or more of: an individual's attributes, name, clinical experience, language, country, affiliation, address, email address, or social media address.

8. The method for cataloging a data set using a computer processor, as described in claim 1, wherein the relevant document metrics of step (c) are user-selected metrics.

9. A method for identifying expertise data within one or more document databases using a computer processor, the method comprising the steps of:
   (a) inputting into a computer processor a plurality of data sources, said data sources having respective expertise data and expertise content;
   (b) processing the expertise data and expertise content of each data source within the one or more document databases;
   (c) creating a document profile for each data source using document relevant metrics;
   (d) assigning a unique identifier to each data source;
   (e) implementing a disambiguation algorithm on each of the created document profiles;
   (f) removing duplicate data sources based upon implementation of the disambiguation algorithm;
   (g) extracting expert level attributes from the processed data sources;
   (h) creating a document profile database;
   (i) updating said document profile database;
   (j) selecting, by a user, ones of the document relevant metrics of the document profile;
   (k) assigning, by the user, a weighting coefficient to each of the selected document relevant metrics;
   (l) aggregating relevant document profiles based on the document relevant metrics for each of the experts, and creating an expert profile; and
   (m) providing a ranking of experts using the assigned weighting coefficients.

10. The method for identifying expertise data within one or more document databases using a computer processor, as described in claim 9, further comprising the step of: (m) providing interactive analytic tools to locate particular experts based upon further expert level attributes.

11. The method for identifying expertise data within one or more document databases using a computer processor, as described in claim 9, wherein the respective expertise data and expertise content of step (a) includes one or more of: publications, conference proceedings, awarded grants, clinical trials, standards, guidelines, patent applications and/or patents.

12. The method for identifying expertise data within one or more document databases using a computer processor, as described in claim 9, wherein the document relevant metrics of step (c) includes one or more of: bibliographic information about publications, date range, first author, last author, h-index, or journal ranking.

13. The method for identifying expertise data within one or more document databases using a computer processor, as described in claim 9, wherein the document relevant metrics of step (c) includes one or more of: an individual's attributes, name, substantive expertise, language, country, affiliation, address, email address, or social media address.

14. The method for identifying expertise data within one or more document databases using a computer processor, as described in claim 9, further comprising the step of: (e1) assigning a unique identifier to an author attribute for each of the data sources processed.

15. The method for identifying expertise data within one or more document databases using a computer processor, as described in claim 9, further comprising the step of: (e2) assigning a unique identifier to each of the document profiles created.

16. A method for cataloging an expert data set using a computer processor, the method comprising the steps of:
   (a) accessing a plurality of documents stored in the data set, said documents each having expert information and data;
   (b) processing the expert information and data of each of the plurality of documents;
   (c) creating a document profile for each of the plurality of documents processed, using document relevant metrics;
   (d) assigning a unique identifier to each of the plurality of documents processed;
   (e) mapping the document profile data using standardization algorithms;
   (f) removing duplicate documents based upon the mapped document profiles;
   (g) integrating the document profile data for consistency using the plurality of data set attributes;
   (h) creating a document profile database using a plurality of data set attributes;
   (i) indexing said document profile database;
   (j) updating said document profile database periodically to incorporate new data set information;
   (k) selecting, by a user, ones of the document relevant metrics of the document profile;
   (l) assigning, by the user, a weighting coefficient to each of the selected document relevant metrics;
   (m) aggregating relevant document profiles based on the document relevant metrics for each of the experts, and creating an expert profile; and
   (n) providing a ranking of experts using the assigned weighting coefficients.

17. The method for cataloging an expert data set using a computer processor, as described in claim 16, further comprising the step of: (e1) assigning a unique identifier to an author attribute for each of the plurality of documents processed.

18. The method for cataloging an expert data set using a computer processor, as described in claim 16, further comprising the step of: (e2) assigning a unique identifier to each of the plurality of created document profiles.

19. The method for cataloging an expert data set using a computer processor, as described in claim 16, wherein the metrics of step (c) includes one or more of keywords or concepts.

20. The method for cataloging an expert data set using a computer processor, as described in claim 16, wherein the respective expert information and data of step (a) includes one or more of: publications, conference proceedings, awarded grants, standards, guidelines, patent applications and/or patents.

21. The method for cataloging an expert data set using a computer processor, as described in claim 16, further comprising the step of: (1) providing interactive analytic tools to locate particular experts based upon further expert level attributes.

22. A computerized system for electronically cataloging an expert data set, comprising: a plurality of computer processors communicatively linked to a plurality of users, wherein the plurality of computer processors implement the method steps of:
  (a) accessing a plurality of documents stored in the data set, said documents each having expert information and data;
  (b) processing the expert information and data of each of the plurality of documents;
  (c) creating a document profile for each of the plurality of documents processed, using document relevant metrics;
  (d) assigning a unique identifier to each of the plurality of documents processed;
  (e) mapping the document profile data using standardization algorithms;
  (f) removing duplicate documents based upon the mapped document profiles;
  (g) integrating the document profile data for consistency using the plurality of data set attributes;
  (h) creating a document profile database using the plurality of data set attributes;
  (i) indexing said document profile database;
  (j) updating said document profile database periodically to incorporate new data set information;
  (k) selecting, by a user, ones of the document relevant metrics of the document profile;
  (l) assigning, by the user, a weighting coefficient to each of the selected document relevant metrics;
  (m) aggregating relevant document profiles based on the document relevant metrics for each of the experts, and creating an expert profile; and
  (n) providing a ranking of experts using the assigning weighting coefficients.

23. The computerized system for electronically cataloging an expert data set, as described in claim 22, wherein the plurality of computer processors are communicatively linked to a plurality of users, using the internet.

* * * * *

UNITED STATES PATENT AND TRADEMARK OFFICE
CERTIFICATE OF CORRECTION

PATENT NO. : 9,684,713 B2
APPLICATION NO. : 14/138783
DATED : June 20, 2017
INVENTOR(S) : Archna Bhandari and Kirk Baker Page 1 of 1

It is certified that error appears in the above-identified patent and that said Letters Patent is hereby corrected as shown below:

On the Title Page

(73) should read:
(73) Assignee: EXPERT SYSTEM FRANCE, Paris (FR)

Signed and Sealed this
Eighth Day of August, 2017

Joseph Matal
*Performing the Functions and Duties of the*
*Under Secretary of Commerce for Intellectual Property and*
*Director of the United States Patent and Trademark Office*